United States Patent
Balnis

(10) Patent No.: US 10,570,273 B2
(45) Date of Patent: Feb. 25, 2020

(54) STARCH PRE-BLEND, STARCH-FILLED RUBBER COMPOSITION, AND RELATED PROCESSES

(71) Applicant: Bridgestone Americas Tire Operations, LLC, Nashville, TN (US)

(72) Inventor: Craig R. Balnis, Aberdeen, NC (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

(21) Appl. No.: 16/042,139

(22) Filed: Jul. 23, 2018

(65) Prior Publication Data

US 2018/0327570 A1  Nov. 15, 2018

Related U.S. Application Data

(62) Division of application No. 15/442,120, filed on Feb. 24, 2017, now Pat. No. 10,030,127.

(60) Provisional application No. 62/309,398, filed on Mar. 16, 2016.

(51) Int. Cl.
| | |
|---|---|
| C08L 3/02 | (2006.01) |
| C08L 9/06 | (2006.01) |
| C08J 3/00 | (2006.01) |
| C08J 3/20 | (2006.01) |
| C08K 3/04 | (2006.01) |
| C08K 3/36 | (2006.01) |
| C08L 91/00 | (2006.01) |

(52) U.S. Cl.
CPC .............. *C08L 3/02* (2013.01); *C08J 3/005* (2013.01); *C08J 3/20* (2013.01); *C08K 3/04* (2013.01); *C08K 3/36* (2013.01); *C08L 9/06* (2013.01); *C08L 91/00* (2013.01); *C08J 2309/06* (2013.01); *C08J 2403/02* (2013.01)

(58) Field of Classification Search
CPC .... C08L 3/02; C08L 91/00; C08L 9/06; C08J 2403/02; C08J 3/20; C08J 3/005; C08J 2309/06; C08K 3/36; C08K 3/04
USPC ......................................................... 524/47
See application file for complete search history.

(56) References Cited

U.S. PATENT DOCUMENTS

| | | |
|---|---|---|
| 4,504,512 A | 3/1985 | Danielson et al. |
| 5,650,454 A | 7/1997 | Hoover et al. |
| 5,672,639 A | 9/1997 | Corvasce et al. |
| 6,080,805 A | 6/2000 | Kaufman |
| 6,096,248 A | 8/2000 | Fraser et al. |
| 6,103,792 A | 8/2000 | Hoover et al. |
| 6,202,726 B1 | 3/2001 | Corvasce et al. |
| 6,273,163 B1 | 8/2001 | Materne et al. |
| 6,345,656 B1 | 2/2002 | Corvasce et al. |
| 6,390,164 B1 | 5/2002 | Beers |
| 2001/0031803 A1 | 10/2001 | Materne et al. |
| 2002/0161073 A1 | 10/2002 | Pawlikowski |
| 2003/0065062 A1 | 4/2003 | Corvasce et al. |
| 2003/0092801 A1 | 5/2003 | Agostini et al. |
| 2003/0109625 A1* | 6/2003 | Galimberti ............ B60C 1/0016 524/495 |
| 2004/0019135 A1 | 1/2004 | Horiguchi et al. |
| 2004/0024093 A1 | 2/2004 | Weydert et al. |
| 2004/0087704 A1 | 5/2004 | Jones et al. |
| 2004/0122134 A1 | 6/2004 | Weydert et al. |
| 2004/0157963 A1 | 8/2004 | Brown et al. |
| 2004/0182486 A1 | 9/2004 | Carlo et al. |
| 2005/0056356 A1 | 3/2005 | Lechtenbohmer et al. |
| 2005/0133135 A1 | 6/2005 | Corvasce et al. |
| 2007/0161733 A1 | 7/2007 | Hogan et al. |
| 2010/0324248 A1 | 12/2010 | Pawlow et al. |
| 2012/0123018 A1 | 5/2012 | Kanz et al. |
| 2013/0079441 A1 | 3/2013 | Kim et al. |
| 2013/0150484 A1 | 6/2013 | Basu et al. |
| 2013/0150496 A1 | 6/2013 | Basu et al. |
| 2013/0231417 A1 | 9/2013 | Vasseur et al. |

FOREIGN PATENT DOCUMENTS

| | | |
|---|---|---|
| EP | 0995775 B1 | 8/2004 |
| WO | 2013086080 A2 | 6/2013 |
| WO | 2013086089 A1 | 6/2013 |
| WO | 2013122661 A1 | 8/2013 |

OTHER PUBLICATIONS

Hossen et al., Japan Journal of Food Engineering, 12(1), 29-35, Mar. 2011. (Year: 2011).*
Bioplastic News, Mater-Bi Biopolymers, 2013. (Year: 2013).*
Qi, Qing et al., "Modification of Starch for High Performance Elastomer," Polymer, vol. 47, issue 11, May 17, 2006, pp. 3896-3903.
Rouilly, Antoine et al., "Synthesis and Properties of Composites of Starch and Chemically Modified Natural Rubber," Polymer, vol. 45, issue 23, Oct. 2004, pp. 7813-7820.

* cited by examiner

*Primary Examiner* — Hui H Chin

(74) *Attorney, Agent, or Firm* — Meredith E. Hooker; Jenny L. Sheaffer

(57) ABSTRACT

Disclosed herein is a liquid pre-blend of starch and oil. The pre-blend comprises starch and oil and can be used (is suitable for use in) a rubber composition. Also disclosed is a process for preparing a starch-filled rubber composition and a starch-filled rubber composition wherein a filler dispersion of at least 90% is achieved.

23 Claims, No Drawings

STARCH PRE-BLEND, STARCH-FILLED RUBBER COMPOSITION, AND RELATED PROCESSES

CROSS REFERENCE TO RELATED APPLICATIONS

This application is a divisional of U.S. application Ser. No. 15/442,120, filed Feb. 24, 2017 and issued as U.S. patent Ser. No. 10/030,127, which application claims priority to and any other benefit of U.S. Provisional Application Ser. No. 62/309,398, filed Mar. 16, 2016, each of which are hereby incorporated by reference in their entirety.

FIELD

The present application is directed to a pre-blend of starch and oil for use in rubber compositions, starch-filled rubber compositions, and related processes such as for preparing the rubber composition using the pre-blend.

BACKGROUND

Starch, particularly starch sourced from plant matter, represents a relatively abundant and renewable resource. Due to its chemical structure, starch is inherently incompatible with rubber elastomers in that it is polar, does not tend to melt during general rubber mixing and, thus, is poorly dispersed when added to rubber compositions, particularly those comprised of diene-based rubbers.

SUMMARY

Disclosed herein are a pre-blend of starch and oil for use in rubber compositions, starch-filled rubber compositions, and related processes such as for preparing the rubber composition using the pre-blend.

In a first embodiment, a liquid pre-blend of starch and oil is provided. The pre-blend comprises starch and oil and can be used (is suitable for use in) a rubber composition.

In a second embodiment, a process for preparing a starch-filled rubber composition is provided. The process comprises providing a liquid pre-blend of starch and oil (i.e., according to the first embodiment), mixing the liquid pre-blend with at least one elastomer and at least one filler to form a starch-filled rubber composition, wherein the starch-filled rubber composition has a filler dispersion of at least 90%.

In a third embodiment, a starch-filled rubber composition is provided. The composition comprises at least one elastomer, about 1 to about 15 phr of starch, about 1 to about 20 phr of at least one oil, and at least one filler comprising carbon black, silica, or a combination thereof, wherein the starch-filled rubber composition has a filler dispersion of at least 90%.

DETAILED DESCRIPTION

Disclosed herein are a pre-blend of starch and oil for use in rubber compositions, starch-filled rubber compositions, and related processes such as for preparing the rubber composition using the pre-blend.

In a first embodiment, a liquid pre-blend of starch and oil is provided. The pre-blend comprises starch and oil and can be used (is suitable for use in) a rubber composition.

In a second embodiment, a process for preparing a starch-filled rubber composition is provided. The process comprises providing a liquid pre-blend of starch and oil (i.e., according to the first embodiment), mixing the liquid pre-blend with at least one elastomer and at least one filler to form a starch-filled rubber composition, wherein the starch-filled rubber composition has a filler dispersion of at least 90%.

In a third embodiment, a starch-filled rubber composition is provided. The composition comprises at least one elastomer, about 1 to about 15 phr of starch, about 1 to about 20 phr of at least one oil, and at least one filler comprising carbon black, silica, or a combination thereof, wherein the starch-filled rubber composition has a filler dispersion of at least 90%.

Definitions

The terminology as set forth herein is for description of the embodiments only and should not be construed as limiting the invention as a whole.

As used herein, the term "liquid" such as in the phrase "liquid pre-blend of starch and oil" refers to a composition that is liquid at 25° C. which is sometimes referred to as room temperature. Generally, a liquid (as that term is used herein) refers to a pourable or flowable substance whereas solids, gels and pastes are neither pourable nor flowable. As non-limiting examples, molasses, ketchup and chocolate syrup would be considered liquids at room temperature whereas mayonnaise and sour cream would not.

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The 100 parts rubber refers to 100 parts of the elastomer.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

Liquid Pre-Blend of Starch and Oil

According to the first embodiment disclosed herein, a liquid pre-blend of starch and oil is provided. The pre-blend comprises starch and oil and can be used (is suitable for use in) a rubber composition. As discussed in more detail both above and below, the second embodiment disclosed herein utilizes the liquid pre-blend of starch and oil and the third embodiment disclosed herein (i.e., a starch-filled rubber composition) is preferably, but not necessarily, made using the pre-blend of the first embodiment to result in a starch-filled rubber composition. All discussions of the liquid pre-blend, as well as its component ingredients, their respective amounts, and the process for preparing the pre-blend should be understood to apply fully to not only the first embodiment but also to the second and third embodiments disclosed herein.

According to the first-third embodiments disclosed herein, the relative amounts of starch and oil used in the liquid pre-blend may vary. In certain embodiments of the first-third embodiments disclosed herein, the relative amounts can be described as follows: sufficient oil is added to the starch to allow the pre-blend to become a liquid at 25° C. or to become a liquid having a viscosity of no more than 50,000 cps at 25° C. The amount of oil required to achieve a liquid pre-blend or a liquid having a viscosity of no more than 50,000 cps may vary depending upon the particular starch utilized as well as the viscosity of the oil utilized; generally, the use of an oil having a relatively lower viscosity will allow for relatively higher amounts of starch to be added to the pre-blend will still maintaining or achieving a pre-blend that is liquid at 25° C. or a liquid pre-blend having a viscosity of no more than 50,000 cps at 25° C. In certain embodiments of the first-third embodiments disclosed herein, the liquid pre-blend comprises about 5 to about 70% by weight starch (including 5 to 70% by weight starch). In certain embodiments of the first-third embodiments disclosed herein, the liquid pre-blend comprises about 5 to about 65% by weight starch, including 5 to 65%, about 5 to about 60%, 5 to 60%, about 5 to about 50%, 5 to 50%, about 5 to about 40%, 5 to 40%, about 10 to about 60%, 10 to 60%, about 10 to about 50%, 10 to 50%, about 10 to about 40%, 10 to 40%, about 20 to about 60%, 20 to 60%, about 20 to about 50%, 20 to 50%, about 20 to about 40%, 20 to 40%, about 30 to about 60%, 30 to 60%, about 30 to about 50%, 30 to 50%, about 30 to about 40%, 30 to 40%, about 40 to about 60%, 40 to 60%, about 40 to about 50%, or 40 to 50% by weight starch. In certain embodiments of the first-third embodiments disclosed herein, the liquid pre-blend comprises about 40 to about 95% (including 40 to 95%) by weight oil or an amount corresponding to the foregoing amounts of starch such that the total of starch and oil adds up to 100%. In other embodiments of the first-third embodiments disclosed herein, a minor amount of one or more additional ingredients (i.e., up to 1%, up to 5%, up to 7% or up to 10% by weight) is added to the liquid-pre-blend; as a non-limiting example in such an embodiment if the liquid pre-blend is considered 100 parts, then the starch might be present in an amount of 5-65 parts, the oil might be present in an amount of 40-90 parts and the one or more additional ingredients might be present in an amount of 1-10 parts. Such additional ingredients may include one or more surfactants, as discussed in more detail below. In certain embodiments of the first-third embodiments disclosed herein, the liquid pre-blend comprises about 50 to about 95% by weight oil, including 50 to 95%, about 60 to about 95%, 60 to 95%, about 70 to about 95%, 70 to 95%, about 40 to about 90%, 40 to 90%, about 50 to about 90%, 50 to 90%, about 60 to about 90%, 60 to 90%, about 70 to about 90%, 70 to 905, about 40 to about 80%, 40 to 80%, about 50 to about 80%, 50 to 80%, about 60 to about 80%, 60 to 80%, about 40 to about 70%, 40 to 70%, about 40 to about 60%, 40 to 60%, about 40 to about 50%, 40 to 50%, about 40 to about 60%, 40 to 60%, about 40 to about 50%, or 40 to 50% by weight oil. In certain embodiments of the second and third embodiments, the starch and oil are utilized in amounts such that they are present in amounts of about 1 to about 15 phr and about 1 to about 20 phr, respectively, in the resulting starch-filled rubber composition; preferably in such embodiments the total amount of starch and oil in the rubber composition comprises about 40 to 95% by weight oil (e.g., if the total amount of starch and oil were 20 phr, the amount of oil in that 20 phr could vary from about 8 phr to about 19 phr) including the above described ranges for the relative weight percentages of oil and starch. In certain embodiments of the second and third embodiments, the starch and oil are used in amounts such that they are present in the resulting starch-filled rubber composition in amounts of: 1 to 15 phr (e.g., 1, 2, 3, 4, 5, 6, 7, 8, 9, 10, 11, 12, 13, 14, or 15 phr) and 1 to 20 phr (e.g., 1, 2, 3, 4, 5, 6, 7, 8, 9, 10, 11, 12, 13, 14, 15, 16, 17, 18, 19, 20), respectively; about 2 to about 15 phr and about 2 to about 20 phr (respectively); 2 to 15 phr and 2 to 20 phr (respectively); about 3 to about 15 phr and about 3 to about 20 phr (respectively); 3 to 15 phr and 3 to 20 phr (respectively); about 4 to about 15 phr and about 4 to about 20 phr (respectively); 4 to 15 phr and 4 to 20 phr (respectively); about 5 to about 15 phr and about 5 to about 20 phr (respectively); 5 to 15 phr and 5 to 20 phr (respectively); about 1 to about 10 phr and about 1 to about 15 phr (respectively); 1 to 10 phr and 1 to 15 phr (respectively); about 2 to about 10 phr and about 2 to about 15 phr (respectively); 2 to 10 phr and 2 to 15 phr (respectively); about 3 to about 10 phr and about 3 to about 15 phr (respectively); 3 to 10 phr and 3 to 15 phr (respectively); about 4 to about 10 phr and about 4 to about 15 phr (respectively); 4 to 10 phr and 4 to 15 phr (respectively); about 5 to about 10 phr and about 5 to about 15 phr (respectively); or 5 to 10 phr and 5 to 15 phr (respectively).

According to the first-third embodiments disclosed herein, the viscosity of the liquid pre-blend may vary. In certain embodiments of the first-third embodiments disclosed herein, the viscosity of the liquid pre-blend is no more than 50,000 cps at 25° C. In certain embodiments of the first-third embodiments disclosed herein, the viscosity of the liquid pre-blend is about 50,000 or less cps at 25° C., including 50,000 cps or less; 45,000 cps or less; 40,000 cps or less; 35,000 cps or less; 30,000 cps or less; 25,000 cps or less; 20,000 or less; 15,000 cps or less; 10,000 cps or less; 8,000 cps or less; 5,000 cps or less; 4,000 cps or less; 3,000 cps or less; 2,000 cps or less; 1,000 cps or less (all of the foregoing viscosities being at 25° C.). In certain embodiments of the first-third embodiments disclosed herein, the viscosity of the liquid pre-blend is 1,000 to 50,000 cps which can be understood to include 1,000 to 40,000 cps; 1,000 to 35,000 cps; 1,000 to 30,000 cps; 1,000 to 25,000 cps; 1,000 to 20,000 cps; 1,000 to 15,000 cps; 1,000 to 10,000 cps; 1,000 to 8,000 cps; 1,000 to 5,000 cps; 1,000 to 4,000 cps; 1,000 to 3,000 cps; 1,000 to 2,000 cps; 2,000 to 40,000 cps; 2,000 to 35,000 cps; 2,000 to 30,000 cps; 2,000 to 25,000 cps; 2,000 to 20,000 cps; 2,000 to 15,000 cps; 2,000 to 10,000 cps; 2,000 to 8,000 cps; 2,000 to 5,000 cps; 2,000 to 4,000 cps; 2,000 to 3,000 cps; 3,000 to 40,000 cps; 3,000 to 35,000 cps; 3,000 to 30,000 cps; 3,000 to 25,000 cps; 3,000 to 20,000 cps; 3,000 to 15,000 cps; 3,000 to 10,000 cps; 3,000 to 8,000 cps; 3,000 to 5,000 cps; 3,000 to 4,000 cps; 4,000 to 40,000 cps; 4,000 to 35,000 cps; 4,000 to 30,000 cps; 4,000 to 25,000 cps; 4,000 to 20,000 cps; 4,000 to 15,000 cps; 4,000 to 10,000 cps; 4,000 to 8,000 cps; 4,000 to 5,000 cps; 5,000 to 40,000 cps; 5,000 to 35,000 cps; 5,000 to 30,000 cps; 5,000 to 25,000 cps; 5,000 to 20,000 cps; 5,000 to 15,000 cps; 5,000 to 10,000 cps; and 5,000 to 8,000 cps (all of the foregoing viscosities being at 25° C.).

In certain embodiments of the first-third embodiments disclosed herein, the liquid pre-blend of starch and oil is non-aqueous. By non-aqueous is meant that the liquid pre-blend is not water-based, and preferably contains less than 5% by weight water, less than 3% by weight water, less than 2% by weight water, less than 1% by weight water, or 0% by weight water. In certain embodiments of the first-third embodiments disclosed herein, the liquid pre-blend contains less than 5% by weight of water or a water soluble plasticizer (e.g., glycerol), less than 2% by weight of water or a water soluble plasticizer (e.g., glycerol), less than 3% by weight of water or a water soluble plasticizer (e.g., glycerol), less than 1% by weight of water or a water soluble plasticizer (e.g., glycerol), or 0% by weight of water or a water soluble plasticizer (e.g., glycerol). In certain embodiments of the second and third embodiments disclosed herein, the rubber composition (into which the starch and oil are incorporated) contains less than 5% by weight water, less than 3% by weight water, less than 2% by weight water, less than 1% by weight water, or 0% by weight water. In certain embodiments of the second and third embodiments disclosed herein, the rubber composition (into which the starch and oil are incorporated) contains less than 5% by weight of water or a water soluble plasticizer (e.g., glycerol), less than 3% by weight of water or a water soluble plasticizer (e.g., glycerol), less than 2% by weight of water or a water soluble plasticizer (e.g., glycerol), less than 1% by weight of water or a water soluble plasticizer (e.g., glycerol), or 0% by weight of water or a water soluble plasticizer (e.g., glycerol).

In certain embodiments of the first-third embodiments disclosed herein, the oil used in combination with the starch (e.g., in the liquid pre-blend of starch and oil) may contain a fatty acid (e.g., in the form of a triglyceride oil) but the amount of crosslinking of such fatty acids is minimized. Crosslinking of fatty acids refers to crosslinking such as may be achieved by using various crosslinking agents such as a peroxide on the fatty acid or oil-containing fatty acid which may be utilized to increase the viscosity of the fatty acid. In certain such embodiments, any fatty acid component of the oil is non-crosslinked and/or has not been crosslinked by any method that would increase its viscosity by 10 points or more (as can be measured using a #2 Zahn Signature Series 90 Viscosity Cup with the sample and ambient temperatures being at 74-78° F. or as can be measured by a similar method).

Starch

As discussed above, according to the first embodiment disclosed herein the liquid pre-blend includes starch. Similarly, according to the second embodiment disclosed herein a process is provided for preparing a starch-filled rubber composition that includes use of the liquid pre-blend according to the first embodiment, i.e., including starch. According to the third embodiment disclosed herein a starch-filled rubber composition is provided which includes starch. All discussions of the starch as follows below should be understood to apply fully to not only the first embodiment but also to the second and third embodiments disclosed herein.

According to the first-third embodiments disclosed herein, the particular type of starch used in the liquid pre-blend can vary. According to the first-third embodiments disclosed herein, one or more than one (e.g., two, three or more) types of starch can be used in the liquid pre-blend. In certain embodiments of the first-third embodiments, the starch comprises a plant starch. In certain embodiments of the first-third embodiments, the starch excludes any animal starch; in other words, in such embodiments the starch is not an animal starch (or comprises 0% by weight animal starch). In certain embodiments of the first-third embodiments, the starch comprises a vegetable starch; non-limiting examples of vegetable starch include potato starch, corn starch, maize starch, tapioca starch, and cassava starch. In certain embodiments of the first-third embodiments, the starch comprises a grain starch; non-limiting examples of grain starch include rice starch, barley starch, and wheat starch. Corn starch and maize starch can also be considered to be a grain starch, in certain embodiments. In certain embodiments of the first-third embodiments disclosed herein, the starch comprises at least one of the following: potato starch, corn starch, maize starch, rice starch, barley starch, wheat starch, tapioca starch, sorghum starch, banana starch, palm starch, or cassava starch. In certain embodiments of the first-third embodiments disclosed herein, the starch comprises a starch selected from the group consisting of potato starch, corn starch, maize starch, rice starch, barley starch, wheat starch, tapioca starch, sorghum starch, banana starch, palm starch, cassava starch, and combinations thereof. Various commercial sources of starch exist, including companies which sell food grade and non-food grades of starches.

The starch utilized in the first-third embodiments disclosed herein is generally in powder or particulate form. The particle size of the starch used in the first-third embodiments disclosed herein may vary. In certain embodiments of the first-third embodiments disclosed herein, the starch (prior to its incorporation into any pre-blend with oil) has an average particle size of less than about 100 microns or less than 100 microns, including less than about 90 microns, less than 90 microns, less than about 80 microns, less than 80 microns, less than about 70 microns, less than 70 microns, less than about 60 microns, less than 60 microns, less than about 50 microns, and less than 50 microns. In certain embodiments of the first-third embodiments disclosed herein, the starch (prior to its incorporation into any pre-blend with oil) has an average particle size of about 1 to about 100 microns, including 1 to 100 microns, about 2 to about 100 microns, 2 to 100 microns, about 3 to about 100 microns, 3 to 100 microns, about 4 to about 100 microns, 4 to 100 microns, about 5 to about 100 microns, 5 to 100 microns, about 1 to about 90 microns, including 1 to 90 microns, about 2 to about 90 microns, 2 to 90 microns, about 3 to about 90 microns, 3 to 90 microns, about 4 to about 90 microns, 4 to 90 microns, about 5 to about 90 microns, 5 to 90 microns, about 1 to about 80 microns, including 1 to 80 microns, about 2 to about 80 microns, 2 to 80 microns, about 3 to about 80 microns, 3 to 80 microns, about 4 to about 80 microns, 4 to 80 microns, about 5 to about 80 microns, 5 to 80 microns, about 1 to about 70 microns, including 1 to 70 microns, about 2 to about 70 microns, 2 to 70 microns, about 3 to about 70 microns, 3 to 70 microns, about 4 to about 70 microns, 4 to 70 microns, about 5 to about 70 microns, 5 to 70 microns, about 1 to about 60 microns, including 1 to 60 microns, about 2 to about 60 microns, 2 to 60 microns, about 3 to about 60 microns, 3 to 60 microns, about 4 to about 60 microns, 4 to 60 microns, about 5 to about 60 microns, 5 to 60 microns, about 1 to about 50 microns, including 1 to 50 microns, about 2 to about 50 microns, 2 to 50 microns, about 3 to about 50 microns, 3 to 50 microns, about 4 to about 50 microns, 4 to 50 microns, about 5 to about 50 microns, and 5 to 50 microns. The average (mean) particle sizes referred to herein are intended to encompass average particle sizes such as can be determined from a histogram prepared by measuring the size of all particles in a sample by a light optical microscopy method. Various standard methods exist for determining average particle size by light optical microscopy methods including, but not limited to, ASTM Method D3849 (while this method is directed to determining average particle size of carbon black using transmission electron microscopy, its principles can be used to measure the average particle size of the starch disclosed herein). In certain embodiments, sonication can be utilized to avoid aggregation of the particles prior to measuring their average particle size. According to the first-third embodiments disclosed, herein the shape of the starch particles may vary. In certain embodiments of the first-third embodiments disclosed herein the starch particles are spherical or oblong. In certain embodiments of the first-third embodiments disclosed herein, the starch particles meet one of the foregoing average particle size dimensions or ranges in at least one and preferably at least two (i.e., two or three) dimensions.

Oil

As discussed above, according to the first embodiment disclosed herein the liquid pre-blend includes oil. Similarly, according to the second embodiment disclosed herein a process is provided for preparing a starch-filled rubber composition that includes use of the liquid pre-blend according to the first embodiment, i.e., including oil. According to the third embodiment disclosed herein a starch-filled rubber composition is provided which includes oil. All discussions of the oil as follows below should be understood to apply fully to not only the first embodiment but also to the second and third embodiments disclosed herein.

According to the first-third embodiments disclosed herein, the particular type of oil used in the liquid pre-blend or starch-filled rubber composition can vary. Generally, any oil utilized will be compatible with the elastomers used in tire rubber compositions, which elastomers can include conjugated diene-based elastomers such as styrene-butadiene rubber, polybutadiene rubber, natural rubber, polyisoprene, and combinations thereof. In certain embodiments of the first-third embodiments, the oil comprises at least one of: a plant oil, a petroleum oil, or a mineral oil. Various types of petroleum oils may be suitable for use in certain embodiments of the first-third embodiments disclosed herein including aromatic, naphthenic, paraffinic, or low PCA petroleum oils. The phrase "low PCA" refers to those oils having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/ 4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Plant-sourced oils, as discussed below, will also generally qualify as low PCA. Suitable plant oils for use in certain embodiments of the first-third embodiments disclosed herein include those that can be harvested from vegetables, nuts, and seeds. Non-limiting examples of suitable plant oils for use in certain embodiments of the first-third embodiments disclosed herein include, but are not limited to, soy or soybean oil, sunflower oil, safflower oil, corn oil, linseed oil, cotton seed oil, rapeseed oil, cashew oil, sesame oil, *camellia* oil, jojoba oil, macadamia nut oil, coconut oil, and palm oil. In certain embodiments of the first-third embodiments disclosed herein, the oil is a liquid at 25° C.

Starch-Filled Rubber Composition

As discussed above, the second embodiment disclosed herein relates to a process for preparing a starch-filled rubber composition and the third embodiment disclosed herein relates to a starch-filled rubber composition. By the phrase starch-filled rubber composition is meant a composition wherein starch (e.g., from the liquid pre-blend of the first embodiment) is combined with rubber or elastomer. Broadly speaking a filler for a rubber composition refers to a component (often a solid component) that differs from the rubber or elastomer matrix in respect to composition and structure and more narrowly speaking is often used to refer to components such as carbon black, silica, or other components that provide reinforcement.

As discussed above, in certain embodiments of the second and third embodiments, the starch and oil are utilized in amounts such that they are present in amounts of about 1 to about 15 phr and about 1 to about 20 phr, respectively, in the resulting starch-filled rubber composition or in one of the other specific amounts discussed above; preferably in such embodiments the total amount of starch and oil in the rubber composition comprises about 40 to 95% by weight oil (e.g., if the total amount of starch and oil were 20 phr, the amount of oil in that 20 phr could vary from about 8 phr to about 19 phr) including the above-described ranges for the relative weight percentages of oil and starch.

Elastomer

As discussed above, according to the second and third embodiments disclosed herein, at least one elastomer is used in the starch-filled rubber composition. By at least one elastomer is meant one or more than one (e.g., two, three, or more) elastomers may be utilized. The particular elastomer or elastomers utilized and well as their respective amounts when more than one is present may vary according to the second and third embodiments disclosed herein. In certain embodiments of the first and second embodiments disclosed herein, the elastomer or elastomers comprise a rubber or rubbers.

In certain embodiments of the first and second embodiments disclosed herein, the at least one elastomer of the rubber composition or used to prepare the starch-filled rubber composition comprises at least one of: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (halogenated, non-halogenated, or both), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, or tetrafluoroethylene-propylene rubber. Examples of fluorinated rubber include perfluoroelastomer rubber, fluoroelastomer, fluorosilicone, and tetrafluoroethylene-propylene rubber.

In certain embodiments of the second and third embodiments disclosed herein, the at least one elastomer of the starch-filled rubber composition or used to prepare the starch-filled rubber composition is (comprises) at least one diene-based elastomer. In certain such embodiments, 100%, 100 parts or 100 phr of the at least one elastomer comprises at least one diene-based elastomer. As used herein, the term "diene-based elastomer" refers to a diene-monomer containing polymer, copolymer, or combination thereof (i.e., more than one polymer, more than one copolymer, one polymer and one copolymer, more than one polymer and one copolymer, more than one copolymer and one polymer, or more than one copolymer and more than one polymer). In accordance with certain embodiments of the second and third embodiments disclosed herein, the at least one diene-based elastomer includes a diene-monomer containing polymer, copolymer, or combination thereof derived from, for example, the polymerization of one or more of the following conjugated diene monomers: 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diene monomers may be utilized in certain embodiments. Non-limiting examples of suitable diene-based elastomers for use in the rubber compositions according to certain embodiments of the second and third embodiments disclosed herein include, but are not limited to, at least one of styrene-butadiene rubber (also referred to as SBR or styrene-butadiene copolymer), polybutadiene, natural rubber, ethylene propylene diene monomer rubber (also known as EPDM rubber), butyl rubber, neoprene, or polyisoprene. In certain embodiments of the second and third embodiments disclosed herein, the at least one diene-based elastomer includes at least one conjugated diene monomer in combination with at least one vinyl aromatic monomer. In accordance with certain embodiments of the second and third embodiments disclosed herein, the at least one diene-based elastomer is a copolymer which results from the polymerization of not only at least one of the foregoing diene monomers but one or more of the following vinyl aromatic monomers: styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the second and third embodiments disclosed herein, the at least one vinyl aromatic monomer comprises styrene. In certain embodiments of the second and third embodiments disclosed herein styrene-butadiene copolymer can be understood to mean a copolymer of styrene and butadiene monomers without any other monomers. In certain embodiments of the second and third embodiments disclosed herein, polybutadiene can be understood to mean a homopolymer of butadiene monomers (e.g., 1,3-butadiene); in certain such embodiments, the polybutadiene has a cis bond content of at least 80%, more preferably at least 90%, at least 92% or at least 95%. In certain embodiments of the second and third embodiments disclosed herein, polyisoprene can be understood to mean a homopolymer of isoprene monomers.

In certain embodiments according to the second and third embodiments disclosed herein, the at least one diene-based elastomer of the rubber composition, particularly styrene-butadiene and/or polybutadiene types of diene-based elastomers, may comprise a functionalized diene-based elastomer. As used herein, the term "functionalized diene-based elastomer" should be understood to include elastomers with a functional group at one or both terminus (e.g., from use of a functionalized initiator, a functionalized terminator, or both), a functional group in the main chain of the elastomer, and combinations thereof. For example, a silica-reactive functionalized elastomer may have the functional group at one or both terminus, in the main chain thereof, or both. In certain embodiments of the second and third embodiments, the at least one diene-based elastomer comprises a functionalized diene-based elastomer that is functionalized at one or both terminus but not within the main chain thereof. In certain such embodiments, the rubber composition of the second and third embodiments comprises about 5 to 100 phr of at least one functionalized diene-based elastomer, including 5 to 100 phr, about 5 to about 90 phr, 5 to 90 phr, about 5 to about 70 phr, 5 to 70 phr, about 5 to about 50 phr, 5 to 50 phr, about 5 to about 40 phr, 5 to 40 phr, about 5 to about 30 phr, 5 to 30 phr, about 10 to about 90 phr, 10 to 90 phr, about 10 to about 70 phr, 10 to 70 phr, about 10 to about 50 phr, 10 to 50 phr, about 10 to about 40 phr, 10 to 40 phr, about 10 to about 30 phr, and 10 to 30 phr. In certain embodiments according to the second and third embodiments disclosed herein, the functionalized diene-based elastomer comprises a diene-based elastomer with a silica-reactive functional group. Non-limiting examples of silica-reactive functional groups that are known to be utilized in functionalizing diene-based elastomers and that are suitable for use in the rubber compositions of certain embodiments of the second and third embodiments disclosed herein include nitrogen-containing functional groups, silicon-containing functional groups, oxygen- or sulfur-containing functional groups, and metal-containing functional groups.

Non-limiting examples of nitrogen-containing functional groups that are known to be utilized in functionalizing diene-based elastomers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the second and third embodiments disclosed herein, the rubber composition comprises a functionalized diene-based elastomer having at least one functional group selected from the foregoing list of nitrogen-containing functional groups.

Non-limiting examples of silicon-containing functional groups that are known to be utilized in functionalizing diene-based elastomers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing diene-based elastomer also include those disclosed in U.S. Pat. No. 6,369,167, the entire disclosure of which is herein incorporated by reference. In certain embodiments according to the second and third embodiments disclosed herein, the rubber composition comprises a functionalized diene-based elastomer having at least one functional group selected from the foregoing list of silicon-containing functional groups.

Non-limiting examples of oxygen- or sulfur-containing functional groups that are known to be utilized in functionalizing diene-based elastomers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group, and a thioketone group. In certain embodiments, the foregoing alkoxy group may be an alcohol-derived alkoxy group derived from a benzophenone. In certain embodiments according to the second and third embodiments disclosed herein, the rubber composition comprises a functionalized diene-based elastomer having at least one functional group selected from the foregoing list of oxygen- or sulfur-containing functional groups.

Generally, diene-based elastomers may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art.

Filler(s)

As discussed above, according to the second and third embodiments disclosed herein, the rubber composition includes at least one filler (second embodiment) or at least one filler comprising carbon black, silica, or a combination thereof (third embodiment). In certain embodiments of the second embodiment, the at least one filler comprises carbon black, silica, or a combination thereof. By stating that at least one filler is utilized is meant that one filler or more than one filler (e.g., two fillers, three fillers, or more) can be utilized. By stating that the at least one filler comprises carbon black, silica, or a combination thereof is meant that one or more than one filler can be utilized and that when more than one filler is utilized it can be any combination of carbon black and silica (e.g., one carbon black and one silica, two carbon blacks, two silicas, one carbon black and two silicas, two carbon blacks and two silicas, etc.). In certain embodiments of the first and second embodiments, the at least one filler comprises at least one reinforcing filler. In certain embodiments of the first and second embodiments, the at least one filler comprises at least one reinforcing filler and at least one non-reinforcing filler.

As used herein, the term "non-reinforcing filler" refers to a particulate material (other than the at least one nano-sized inorganic material) that has a nitrogen surface area of less than about 20 m$^2$/g (including less than 20 m$^2$/g), and in certain embodiments less than about 10 m$^2$/g (including less than 10 m$^2$/g). The nitrogen surface area of such a non-reinforcing filler particulate material can be determined according to various standard methods (including ASTM D6556 or D3037). In certain embodiments of the first-third embodiments disclosed herein, the term "non-reinforcing filler" is additionally or alternatively used to refer to a particulate material that has a particle size of greater than about 1000 nm (including greater than 1000 nm).

As used herein, the term "reinforcing" as used with respect to the phrases such as "reinforcing filler" and "reinforcing carbon black filler," generally should be understood to encompass both fillers that are traditionally described as reinforcing as well as fillers that may be described as semi-reinforcing. Traditionally, the term "reinforcing filler" is used to refer to a particulate material that has a nitrogen absorption specific surface area (N$_2$SA) of more than about 100 m$^2$/g, and in certain instances more than 100 m$^2$/g, more than about 125 m$^2$/g, more than 125 m$^2$/g, or even more than about 150 m$^2$/g or more than 150 m$^2$/g. Alternatively or additionally, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area (N$_2$SA), or both, to a non-reinforcing filler and a reinforcing filler. In certain embodiments of the first-third embodiments disclosed herein, the term "reinforcing filler" is used to refer to a particulate material that has a nitrogen absorption specific surface area (N$_2$SA) of about 20 m$^2$/g or greater, including 20 m$^2$/g or greater, more than about 50 m$^2$/g, more than 50 m$^2$/g, more than about 100 m$^2$/g, more than 100 m$^2$/g, more than about 125 m$^2$/g, and more than 125 m$^2$/g. In certain embodiments of the first-fourth embodiments disclosed herein, the term "reinforcing filler" is additionally or alternatively used to refer to a particulate material that has a particle size of about 10 nm up to about 1000 nm, including 10 nm up to 1000 nm, about 10 nm up to about 50 nm, and 10 nm up to 50 nm.

Various carbon blacks in varying amounts are suitable for use in those embodiments of the second and third embodiments which utilize one or more carbon blacks as a filler. In certain embodiments of the second and third embodiments disclosed herein, the rubber composition comprises about 5 to about 100 phr (including 5 to 100 phr) of one or more carbon blacks. In certain embodiments of the second and third embodiments disclosed herein, the total amount of carbon black filler is 5 to 100 phr, including about 10 to about 100 phr, 10 to 100 phr, about 10 to about 90 phr, 10 to 90 phr, about 25 to about 90 phr, 25 to 90 phr, about 35 to about 90 phr, 35 to 90 phr, about 25 to about 80 phr, 25 to 80 phr, about 35 to about 80 phr, or 35 to 80 phr. Generally, suitable carbon black for use in the rubber composition of certain embodiments of the second and third embodiments disclosed herein includes any of the commonly available, commercially-produced carbon blacks, including those having a surface area of at least about 20 m$^2$/g (including at least 20 m$^2$/g) and, more preferably, at least about 35 m$^2$/g up to about 200 m$^2$/g or higher (including 35 m$^2$/g up to 200 m$^2$/g). Surface area values for carbon black as used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the second and third embodiments disclosed herein, the rubber composition includes a mixture of two or more of the foregoing blacks. Typical suitable carbon blacks for use in certain embodiments of the second and third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred. As those of skill in the art will understand, most carbon blacks are reinforcing fillers. However, non-reinforcing carbon black fillers can alternatively or additionally be utilized. Non-limiting examples of non-reinforcing carbon blacks include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

Various silica fillers in varying amounts are suitable for use in those embodiments of the second and third embodiments which utilize one or more silicas as a filler. The amount of silica filler(s) utilized can vary and in certain embodiments of the second and third embodiments disclosed herein, the rubber composition comprises about 5 to about 200 phr of silica filler. One or more than one silica filler may be utilized in the rubber compositions according to the second and third embodiments disclosed herein. In certain embodiments of the second and third embodiments disclosed herein, the total amount of silica filler is 5 to 200 phr, including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr of at least one filler. In certain embodiments, the useful upper range for the amount of silica filler can be considered to be somewhat limited by the high viscosity imparted by fillers of this type.

Non-limiting examples of silica fillers suitable for use in the rubber compositions of certain embodiments of the second and third embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments of the second and third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the second and third embodiments disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the second and third embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the second and third embodiments disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165 MP), and J. M. Huber Corporation.

In certain embodiments of the second and third embodiments disclosed herein, as discussed in more detail below, a reinforcing silica filler comprising a silica that has been pre-treated with a silica coupling agent may be utilized; preferably any pre-treated silica comprises a silica that has been pre-treated with a silane-containing silica coupling agent.

In certain embodiments of the first and second embodiments disclosed herein, the total amount of reinforcing filler included in the rubber composition (including any reinforcing silica filler and any reinforcing carbon black filler) is about 5 to about 200 phr, including 5 to 200 phr, about 5 to about 150 phr, 5 to 150 phr, about 5 to about 120 phr, 5 to 120 phr, about 5 to about 100 phr, 5 to 100 phr, about 5 to about 90 phr, 5 to 90 phr, about 5 to about 80 phr, 5 to 80 phr, about 5 to about 70 phr, 5 to 70 phr, about 10 to about 100 phr, 10 to 100 phr, about 10 to about 90 phr, 10 to 90 phr, about 10 to about 80 phr, 10 to 80 phr, about 10 to about 70 phr, 10 to 70 phr, about 20 to about 100 phr, 20 to 100 phr, about 20 to about 90 phr, 20 to 90 phr, about 20 to about 80 phr, 20 to 80 phr, about 20 to about 70 phr, or 20 to 70 phr.

In certain embodiments of the second and third embodiments, at least one additional filler (i.e., either in addition to the above-discussed carbon black and/or silica fillers or as the at least one filler of the second embodiment) is present in the rubber composition. The particular amount and type of any such additional filler may vary. Non-limiting examples of suitable additional fillers for use in certain embodiments of the second and third embodiments include, but are not limited to talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof. The total amount of any such additional filler present in the rubber compositions of the second and third embodiments may vary from about 1 to about 100 phr, including 1 to 100 phr, at least 1 phr, at least 5 phr, at least 10 phr, less than 100 phr, less than 90 phr, less than 80 phr, less than 70 phr, less than 60 phr, less than 50 phr, or amounts within the foregoing.

Other Ingredients

In certain embodiments of the first-third embodiments disclosed herein, the liquid pre-blend of starch and oil includes one or more surfactants; in certain such embodiments the surfactant comprises at least one ionic surfactant, at least one non-ionic surfactant, or a combination thereof (i.e., at least one of each type of surfactant). As used herein, the term nonionic surfactant refers to a surfactant that has a hydrophilic group that is not ionized when dissolved in water. Non-limiting examples of non-ionic surfactants that may be suitable for use in certain embodiments of the first-third embodiments disclosed herein include, but are not limited to, polyethylene glycol alkyl ether, polyethylene glycol fatty acid ester, alkyl glucoside, fatty acid alkanolamide, glycerin fatty acid ester, alkyl glyceryl ether, sorbitan fatty acid ester, polyethylene glycol sorbitan fatty acid ester, and sucrose fatty acid ester. In certain embodiments of the first-third embodiments disclosed herein, the one or more surfactants comprises a polyethylene glycol sorbitan fatty acid ester having the following formula:

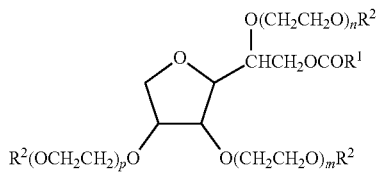

wherein $R^1$ is a monovalent organic group having a carbon number of from about 11 to about 24, each $R^2$ is independently hydrogen or a group the may be represented by the formula $C(O)R^1$, and m, n, and p are independently an integer from 1 to about 10. In one or more embodiments of the first-third embodiments, the mono-valent organic groups may be hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl group. These hydrocarbyl groups may contain heteroatoms such as, but not limited to, nitrogen, oxygen, boron, silicon, tin, sulfur, and phosphorus atoms. In one or more embodiments of the first-third embodiments, $R^1$ is an alkyl or alkenyl group having a carbon number of from about 11 to about 24. In one or more embodiments of the first-third embodiments, $R^1$ is an alkyl or alkenyl group having a carbon number of from about 11 to 14. Non-limiting examples of particular polyethylene glycol sorbitan fatty acid esters that may be suitable for use in certain embodiments of the first-third embodiments include: polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitol tetraoleate, or mixtures thereof. As used herein, the term ionic surfactant refers to a surfactant that generates ions when dissolved in water. Ionic surfactants can be classified as cationic surfactants (which generate positive ions) or anionic surfactants (which generate negative ions). Non-limiting examples of suitable ionic surfactants for use in certain embodiments of the first-third embodiments disclosed herein include those with a molecular structure comprising one or more linear or branched alkyl chains and a positively charged heterocyclic moiety (polar moiety). The alkyl chain can contain 1 to 50 carbon atoms. For example, the alkyl chain can be selected from the group consisting of butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, and triacontyl. Preferably, the alkyl chain can be selected from the group consisting of octyl, nonyl, decyl, undecyl, dodecyl, tridecyl, tetradecyl, pentadecyl, and hexadecyl. The positively charged heterocyclic moiety may have a nitrogen-containing heterocyclic structure. The number of nitrogen atoms presented in the structure can be 1, 2, or 3. Exemplary nitrogen-containing heterocyclic structures that can constitute the polar moiety of the ionic liquid surfactants include, but are not limited to, imidazole, 1-methylimidazole, pyrazine, pyrazole, pyridazine, pyridine, imidazolidine, piperazine, piperidine, pyrazolidine, pyrrolidine, the derivatives thereof, and the mixture thereof. Any inorganic or organic anion can be the counter ion for the positively charged heterocyclic moiety, for example, halide ion such as $Cl^-$ or $Br^-$, $BF_4^-$, $PF_6^-$, $CO_3^{2-}$, $SO_4^{2-}$, $HSO_4^-$, or $HPO_4^{2-}$. In certain embodiments of the first-third embodiment where at least one ionic surfactant is utilized, the ionic surfactant may have the following formula:

wherein $R^3$ and $R^4$ are linear or branched alkyl radicals containing 1 to 50 carbon atoms, $X^-$ is the counter ion and can be $Cl^-$, $Br^-$, $BF_4^-$, $PF_6^-$, $CO_3^{2-}$, $SO_4^{2-}$, $HSO_4^-$, or $HPO_4^{2-}$. In certain embodiments of the first-third embodiments where at least one ionic surfactant is utilized, the ionic surfactant is at least one of a sulfonate or a sulfate with the general formulas $R-SO_3M$ and $R-OSO_3M$, respectively, where R represents a hydrophobic moiety and M represents an alkali metal; non-limiting examples of the foregoing ionic surfactants include, but are not limited to, sodium dodecyl sulfate, sodium lauryl sulfate, sodium salts of sulfated Neodol® alcohols, sodium salts of sulfated Neodol® ethoxylates, sodium dodecyl benzene sulfonate, sodium alkyl naphthalene sulfonate, sodium dioctyl sulfosuccinate, and combinations thereof. Salts of sulfated alkyl-phenol ethoxylates are also be used as an ionic (anionic) surfactants; non-limiting examples of the foregoing include: alkyl-phenol ethoxylates represented by the formula $R^5(OC_2H_4)_nOH$, where $R^5$ is usually an octyl or nonyl chain and n has a value from 1 to 35, preferably 4 to 15.

In those embodiments of the second and third embodiments disclosed herein where the rubber composition includes silica filler, the composition will also preferably include (further comprise) one or more silica coupling agents. Silica coupling agents are useful in preventing or reducing aggregation of the silica filler within the rubber composition. Aggregates of the silica filler particles are believed to undesirably increase the viscosity of the rubber composition, and, therefore, preventing this aggregation reduces the viscosity and improves the processibility and blending of the rubber composition.

Generally, any conventional type of silica coupling agent can be used in those embodiments of the second and third embodiments which include one or more silica coupling agents, such as those having a silane and a constituent component or moiety that can react with a polymer, particularly a vulcanizable polymer. The silica coupling agent acts as a connecting bridge between silica and the polymer. Suitable silica coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the second and third embodiments, the silica coupling agent is in the form of a pre-treated silica, i.e., a pre-treacted silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

The amount of silica coupling agent used in those embodiments of the second and third embodiments which include a silica coupling agent may vary. In certain embodiments of the second and third embodiments disclosed herein, the silica coupling agent is present in an amount sufficient to provide a ratio of the total amount of silica coupling agent to reinforcing silica filler of 1:100 to 1:5 (i.e., 1 to 20 parts by weight per 100 parts of silica), including 1:100 to 1:10, 1:100 to 1:20, 1:100 to 1:25 as well as 1:100 to 1:50. In certain embodiments according to the second and third embodiments disclosed herein, the amount of silica coupling agent in the rubber composition is 0.01 to 10 phr, 0.01 to 5 phr, or 0.01 to 3 phr.

In certain embodiments of the second and third embodiments disclosed herein, the rubber composition may comprise one or more additional ingredients such as waxes, processing aids, tackifying resins, reinforcing resins, antioxidants, peptizers, or a cure package (i.e., at least one of a vulcanizing agent, a vulcanizing accelerator, a vulcanizing additive, a vulcanizing inhibitor, or an anti-scorching agent). In certain embodiments of the second and third embodiments, one or more than one of each of the foregoing types of ingredients may be present in the rubber composition.

In certain embodiments of the second and third embodiments, the rubber composition includes a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the second and third embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in certain embodiments of the compositions and methods of the second and third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. In certain embodiments of the second and third embodiments, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the compositions and methods of the second and third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Preparation of the Liquid Pre-Blend of Starch and Oil

The particular process used to prepare the liquid pre-blend of starch and oil (i.e., according to the first embodiment disclosed herein, as may be used in the second embodiment disclosed herein, and as may be used in certain embodiments of the third embodiment disclosed herein) may vary. Generally, the starch and oil are combined together and the liquid pre-blend is formed using some type of mixing. The particular type of mixing used is not particularly limited as long as the liquid pre-blend is obtained from what begins as a mixture of a solid (starch) and a liquid (oil). Suitable types of mixing include shaking, stirring, and blending. Useful apparatus for the mixing include but are not limited to mills, mixers, extruders, and blenders. In certain embodiments relating to the first-third embodiments disclosed herein, the liquid pre-blend of starch and oil is prepared by a process that includes heating. Preferably in such embodiments, the starch and oil are heated above room temperature after being combined, but alternatively or additionally the oil may be pre-heated to above room temperature prior to addition of any starch. In those embodiments of the first-third embodiments which involve heating of the starch, oil or both, the temperature to which the ingredient(s) are heated may vary. Generally, heating to above room temperature may be useful in facilitating the incorporation of the starch into the oil. However, heating to temperatures which reach either the smoke point of the oil or a temperature at which the starch begins to decompose should be avoided. As those of skill in the art will understand, a suitable heating temperature which both avoids reaching a temperature at which the starch begins to decompose and also avoids the smoke point of the oil will vary depending upon the type or types of starches utilized and the type of types of oils utilized; in certain embodiments of the first-third embodiments, the heating temperature is at least 5° C., at least 10° C., at least 15° C. or even at least 20° C. below the lower of the decomposition temperature of the starch (or below the lowest decomposition temperature if more than one type of starch is used) and the smoke point of the oil (or below the lower smoke point temperature if more than one type of oil is used). In certain such embodiments, the oil (either alone, i.e., pre-heated, or in combination with the starch) is heated to a temperature of at least 30° C., at least 35° C., at least 40° C., at least 45° C., at least 50° C., at least 55° C., at least 60° C., at least 65° C., at least 70° C., at least 75° C., at least 80° C., at least 85° C., at least 90° C., at least 95° C. or at least 100° C.; in certain such embodiments the maximum temperature reached by the oil (either alone, i.e., pre-heated, or in combination with the starch) is at least 5-10 degrees C. below the smoke point of the oil. In certain embodiments of the first-third embodiments, the maximum temperature of the oil or the blend of starch and oil is no more than 150° C., no more than 140° C., no more than 130° C., no more than 120° C., no more than 110° C., or no more than 100° C. In certain embodiments of the first-third embodiments, the heating of the oil (either alone, i.e., pre-heated, or in combination with the starch) takes place in combination with mixing. In certain embodiments of the first-third embodiments, the mixing of the starch and oil takes place for a period of time such as 5 minutes-5 hours, including 5 minutes-2 hours, 5 minutes-1 hour, or for a period of time such as 15 minutes, 30 minutes, 1 hour, 2 hours, 3 hours, 4 hours, 5 hours, or more. In certain embodiments of the first-third embodiments, mixing for one of the foregoing periods of time is combined with heating such as heating to one of the foregoing temperatures or within one of the foregoing temperature ranges. In certain embodiments of the first-third embodiments where heating of the oil (either alone, i.e., pre-heated, or in combination with the starch) is utilized, the liquid pre-blend of oil and starch is cooled or allowed to cool to a temperature of around 25° C. or 25-50° C. prior to addition of the liquid pre-blend to other components of the rubber composition such as the elastomer(s). In other embodiments of the first-third embodiments where heating of the oil (either alone, i.e., pre-heated, or in combination with the starch) is utilized, no cooling of the liquid pre-blend is performed or required prior to adding it to the other components of the rubber composition such as the elastomer(s); in certain such embodiments, the liquid pre-blend of oil and starch is intentionally added to the other components of the rubber composition while still at or near one of the heating temperatures described above so as to be more pourable or flowable (which facilitates addition) when added to the other components.

According to the first-third embodiments disclosed herein, preparation of the liquid pre-blend of starch and oil may take place in the same vessel or container in which the liquid pre-blend is mixed with the other components of the rubber composition (e.g., the at least one elastomer and at least one filler) by a process which entails first preparing the liquid pre-blend of starch and oil and then adding the other components of the rubber composition to the pre-blend; in other words a single vessel or container can be utilized for both the preparation of a liquid pre-blend of starch and oil and for mixing of the liquid pre-blend with the other components of the rubber composition (e.g., the at least one elastomer and at least one filler). Alternatively, according to other embodiments of the first-third embodiments disclosed herein, preparation of the liquid pre-blend of starch and oil may take place in a first vessel that is separate from a second vessel in which the liquid pre-blend is mixed with the other components of the rubber composition (e.g., the at least one elastomer and at least one filler). In certain embodiments of the first-third embodiments, it is advantageous to avoid use of a starch which contains enough moisture to cause clumping or compacting when preparing the pre-blend. In certain embodiments of the first-third embodiments where the starch may have excess moisture (e.g., after storage or shipment under highly humid conditions), it may be useful to dehydrate the starch to remove sufficient moisture to avoid clumping or compacting prior to addition of the starch to the oil to prepare the pre-blend. Various standard methods can be employed for the dehydrating including use of desiccants, purging with an inert gas, or a combination thereof. In certain embodiments of the first-third embodiments, it may be advantageous to sift, sieve, screen or otherwise process the starch prior to addition to the oil (regardless of its moisture content) to prepare the pre-blend so as to avoid addition of any clumps of the starch into the oil.

Processes for Preparing a Starch-Filled Rubber Composition

As discussed above, the second embodiment disclosed herein is directed to a process for preparing a starch-filled rubber composition which process comprises providing a liquid pre-blend according to the first embodiment, and mixing the liquid pre-blend with at least one elastomer and at least one filler to form a starch-filled rubber composition wherein the starch-filled rubber composition has a dispersion of at least 90%. As also discussed above, the third embodiment disclosed herein is directed to a starch-filled rubber composition comprising at least one elastomer, about 1 to about 15 phr of starch, about 1 to about 20 phr of at least one oil, and at least one filler comprising carbon black, silica, or a combination thereof, wherein the starch-filled rubber composition has a dispersion of at least 90%. The starch-filled rubber composition of the third embodiment may be prepared according to the process of the second embodiment, although other processes which differ in one or more aspects from the process of the second embodiment may also be employed.

Processes for preparing rubber compositions according to the second embodiment disclosed herein and suitable processes to prepare the rubber compositions of the third embodiment disclosed herein will generally entail mixing together of the ingredients of the rubber composition (as described above) by methods known in the art, such as, for example, by kneading the ingredients together in a Banbury mixer or on a milled roll. Such methods generally include at least one non-productive master-batch mixing stage and a final productive mixing stage. The phrase non-productive master-batch stage is known to those of skill in the art and generally understood to be a mixing stage where no vulcanizing agents or vulcanization accelerators are added. The phrases non-productive stage and master-batch stage are used interchangeably herein with the phrase non-productive master-batch stage. In certain embodiments of the compositions and methods of the second and third embodiments disclosed herein, more than one non-productive master-batch mixing stage may be used; in such embodiments the phrase "non-productive mixing" can be utilized to encompass all non-productive or master-batch mixing stages. The phrase final productive mixing stage is also known to those of skill in the art and generally understood to be the mixing stage where the vulcanizing agents and vulcanization accelerators are added into the rubber composition.

In certain embodiments of the compositions and methods of the second and third embodiments disclosed herein, the non-productive master batch mixing stage(s) may be conducted at a temperature of about 130° C. to about 200° C. In certain embodiments of the compositions and methods of the second and third embodiments disclosed herein, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

The stage or stages at which the starch and oil (e.g., as a liquid pre-blend) are added to the other components of the rubber composition may vary according to the embodiments of the second and third embodiments disclosed herein. In certain embodiments of the compositions and methods of the second and third embodiments disclosed herein, the starch and oil (e.g., as a liquid pre-blend) are added during at least one non-productive mixing stage; in certain such embodiments, the starch and oil (e.g., as a liquid pre-blend) are added (entirely) during the first non-productive mixing stage, in other embodiments (entirely) during a second non-productive mixing stage, and in yet other embodiments during both first and second non-productive stages. In other embodiments of the compositions and methods of the second and third embodiments disclosed herein, a liquid pre-blend of the starch and oil is added during productive mixing, either entirely or in part. In certain embodiments of the compositions and methods of the second and third embodiments disclosed herein, the starch and oil (e.g., as a liquid pre-blend) are added to the rubber composition during a non-productive mixing stage and the process further comprises addition of cure package ingredients during a final productive mixing stage. In certain embodiments of the compositions and methods of the second and third embodiments disclosed herein, the starch and oil (e.g., as a liquid pre-blend) are added at a stage that does not include the use of large amounts of hydrophilic ingredients.

Dispersion

As discussed above, according to the process of the second embodiment a starch-filled rubber composition is formed which has a dispersion of at least 90%. As also discussed above, the starch-filled rubber composition of the third embodiment has a dispersion of at least 90%. As used herein, the term dispersion is used to refer to the dispersion of the starch within the rubber composition and provides an indication of the dispersion of the starch throughout the rubber composition. However, when other fillers (such as carbon black and/or silica) are present in the rubber composition in addition to the starch, then the term filler dispersion can be used to refer to the overall dispersion of the starch and the other fillers in the rubber composition. The dispersion of the starch-filled rubber composition can be measured by various methods, including according to ASTM Method D2663-14 (or the related procedure described in the working Examples). While D2663-14 is directed to measurement of carbon black dispersion, it can be adapted for use in measuring the dispersion of starch particles (or the overall dispersion of all fillers in a rubber composition). Alternatively, the dispersion of the starch particles in the rubber composition (or the overall dispersion of all fillers in a rubber composition) can be measured using ASTM D7723—11 Standard Test Method for Rubber Property—Macro-Dispersion of Fillers in Compounds.

As discussed above, the starch-filled rubber composition has a dispersion (either of the starch alone or an overall filler dispersion) of at least 90%. The dispersion that can be achieved using the liquid pre-blend of starch and oil is higher than can be achieved by using the starch and oil components in a non-pre-blended manner. In certain embodiments of the second and third embodiments, the starch-filled rubber composition has a dispersion (either of the starch alone or an overall filler dispersion) of at least 91%, at least 92%, at least 93%, at least 94%, or more. In certain embodiments of the second and third embodiments, the starch-filled rubber composition has a dispersion of 90-98%, 90-97%, 90-96%, 90-95% or 90-94%. Alternatively, in other embodiments of the second and third embodiments, the dispersion (either of the starch alone or an overall filler dispersion) achieved using the pre-blend is measured as an improvement in the dispersion as compared to using the starch in a non-pre-blended form; in certain such embodiments, the improvement in dispersion (either of the starch alone or an overall filler dispersion) is at 10%, at least 15%, at least 20% or more. As a non-limiting example, a 20% n improvement in dispersion would be represented by a rubber composition utilizing a pre-blend and achieving a dispersion of 90% as compared to a control rubber composition using the starch in a non-pre-blended form that achieved a dispersion of only 75%.

Tires and Tire Components

The starch-filled rubber compositions according to the third embodiment disclosed herein and as result from the process of the second embodiment disclosed herein are generally suitable for use in one or more tire components. Non-limiting examples of such tire components include treads, subtreads, sidewalls, bead fillers, body ply skims, subtreads and innerliners. In certain embodiments of the third embodiment, the starch-filled rubber composition is incorporated into at least one component of a tire (e.g., tread, subtread, sidewall, bead filler, body ply skim, subtread, innerliner); in other words, a tire comprising (having) at least one component comprised of a rubber composition according to the third embodiment is disclosed herein. In certain embodiments of the second embodiment, the starch-filled rubber composition that results from the process is incorporated into at least one component of a tire (e.g., tread, subtread, sidewall); in other words, a tire comprising (having) at least one component comprises of a rubber composition resulting from the process of the second embodiment is disclosed herein.

Improved Wear

Without being bound by theory, it is believed that the starch-filled rubber compositions according to the third embodiment disclosed herein and as result from the process of the second embodiment disclosed herein will exhibit improved wear based upon the use of the pre-blended form of starch. The improvement in wear is as compared to a rubber composition containing the same ingredients (and in the same amounts) but wherein the starch is not pre-blended with oil before addition to the rubber composition. In certain embodiments of the second and third embodiment, an improvement in wear of at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, or more (e.g., at least 25%, at least 30%) can be achieved by using the pre-blended form of starch. As those of skill in the art will understand, an improvement in wear can be measured according to various standard methods and techniques.

For example, wear (or abrasion resistance) of a rubber composition can be measured according to a Lambourn abrasion test which can be conducted according to the following method. Test specimens are rubber wheels of about 48 mm in outside diameter, about 22 mm in inside diameter and about 4.8 mm in thickness. The test specimens are placed on an axle and run at various slip ratios against a driven abrasive surface for approximately 75 seconds. The abrading surface used is 120 grit 3M-ite. A load of about 2.5 kg is applied to the rubber wheel during testing. A linear, least squares curve-fit is applied to the weight loss data as a function of time. The slope of the line is the abrasion rate. A wear index can be calculated based upon one-hundred multiplied by the control compound abrasion rate divided by the subject compound abrasion rate. Thus, a wear index less than 100 will indicate a composition which abrades at a higher rate (has less/worse abrasion resistance) than its respective control composition and a wear index greater than 100 will indicate a composition which has improved abrasion resistance than its respective control composition.

Alternatively, wear (or abrasion resistance) can be measured according to a PICO method, e.g., using a Pico apparatus operated according to or under the guidance of ASTM Method D-2228.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the elastomers, fillers, and other ingredients (e.g., processing oil, antioxidant, and curative package ingredients) utilized in the following examples should not be interpreted as limiting since other such ingredients consistent with the disclosure in the Detailed Description can be utilized in substitution. In other words, the particular starch, particular oil and their relative amounts as used in the following examples should be understood to apply to the more general content of the Detailed Description.

Example 1

A liquid pre-blend of starch and oil was prepared by mixing a low PCA petroleum oil (50 grams) with an equal weight amount of starch using a magnetic stir bar. The starch utilized was a commercially obtained corn starch. The mixture of the starch and oil was heated to 70° C. for 1 hour using a magnetic stir bar.

Examples 2-4

Rubber compositions were prepared comprising the components presented in Table 1 and using the mixing procedure presented in Table 2. Example 2 is a control or comparative example which contains no starch. Example 3 is a control or comparative example wherein 5 phr of starch was added without the use of any pre-blend of oil and starch. In Example 4, the liquid pre-blend of starch and oil as prepared in Example 1 was utilized.

| | Sample # | | |
|---|---|---|---|
| | 2 (Control) | 3 (Control) | 4 |
| Master-Batch First non-productive | | | |
| SBR | 30 | 30 | 30 |
| Oil-extended SBR | 84 | 84 | 84 |
| Carbon black (N330) | 4 | 4 | 4 |
| Silica | 48 | 48 | 48 |
| Silane | 4.8 | 4.8 | 4.8 |
| Processing oil | 8.2 | 8.2 | 8.2 |
| Activators | 1.5 | 1.5 | 1.5 |
| Antioxidant | 1.5 | 1.5 | 1.5 |
| Hydrocarbon resin | 4 | 4 | 4 |
| Second non-productive stage | | | |
| Silica | 28 | 28 | 28 |
| Silane | 2.8 | 2.8 | 2.8 |
| Corn starch | 0 | 5 | 0 |

-continued

| | Sample # | | |
|---|---|---|---|
| | 2 (Control) | 3 (Control) | 4 |
| Preblended corn starch | 0 | 0 | 10 |
| Activator | 1 | 1 | 1 |
| Antioxidant | 1.5 | 1.5 | 1.5 |
| Hydrocarbon resin | 4 | 4 | 4 |
| Processing aid | 1.5 | 1.5 | 1.5 |
| Final Batch | | | |
| Activator | 2 | 2 | 2 |
| Sulfur | 1.6 | 1.6 | 1.6 |
| Accelerator | 4.25 | 4.25 | 4.25 |
| Antioxidant | 0.22 | 0.22 | 0.22 |
| Processing aid | 0.5 | 0.5 | 0.5 |
| Total phr | 233.37 | 238.37 | 243.37 |

TABLE 2

Mixing Parameters

| Stage | Time | Condition |
|---|---|---|
| Master-Batch Stage (initial temp: 105° C., rotor 50 rpm) | 0 seconds 30 seconds 210 seconds | Charge polymers Charge filler (silica) and other master-batch ingredients Drop based on time or max temperature of 160° C. |
| $2^{nd}$ Master-Batch Stage (initial temp: 80° C., rotor rpm at 50) | 0 seconds 50 seconds 190 seconds | Charge master-batch Charge filler (silica) and other ingredients for second non-productive stage Drop on mixing time or max temperature of 150° C. |
| Remill Stage (initial temp: 80° C., rotor rpm at 50) | 0 seconds 120 seconds | Charge $2^{nd}$ Master-Batch Drop on mixing time or max temperature of 150° C. |
| Final Batch Stage (initial temp: 80° C., rotor rpm at 50) | 0 seconds 0 seconds 100 seconds | Charge Remill Charge final batch ingredients Drop on mixing time or max temperature of 99° C. |

After curing for 15 minutes at 170° C., each of the rubber compositions of Examples 2-4 were tested for various properties, as detailed below. The results are shown in Table 3 below, presented in an indexed format wherein each indexed value was prepared by dividing the measured value by the respective measured value for control Example 2 and multiplying by 100. The abbreviation EB is used for elongation at break (made in terms of % elongation), which measurement provides an indication of a rubber component's tear resistance, which is relevant when it is incorporated into a tire tread. The abbreviation TB is used for tensile at break, which measurement (made in units of MPa) provides an indication of a rubber's strength by measuring the maximum stress it can withstand before breaking. The abbreviation M300 is used for tensile stress at 300% elongation.

Tensile mechanical properties (i.e., M300, EB and TB) of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in the Table below as engineering-stresses by reference to the original cross-sectional area of the test piece. The specimens were tested at 25° C. unless indicated to the contrary.

The viscoelastic temperature sweep for the tan δ measurements was conducted using a spectrometer manufactured by Ueshima Seisakusho Co., Ltd (a dynamic viscoelasticity measuring device) with test conditions of −50 to 15° C. at 0.1% strain, and 15 to 100° C. at 4% strain and 52 Hz; the testing was performed following the guidelines of, but not restricted to, the standard procedure described in ASTM D5992. A rubber composition's tan δ at 0° C. is indicative of its wet traction when incorporated into a tire tread, its tan δ at 30° C. is indicative of its dry traction when incorporated into a tire tread and its tan δ at 60° C. is indicative of its rolling resistance when incorporated into a tire tread. Higher values of tan δ at 0° C. and 30° C. are beneficial (indicating improved wet and dry traction) whereas lower values of tan δ at 60° C. are beneficial (indicating reduced rolling resistance which equates to improved fuel economy).

Filler dispersion was measured using a dispersion testing apparatus from Alpha Technologies. The apparatus is designed to measure the dispersion of fillers (such as carbon black) in mixed rubber compositions by using a reflected light microscope to analyze the shadows cast by filler agglomerates that are present in a freshly cut sample surface (the sample size should fill the image window). The measurement was performed upon a flat, fresh cut surface of a sample of the cured rubber composition following the guidance of, but not strictly according to the operating manual for the apparatus and ASTM Method D2663-14.

TABLE 3

| Property | 2 | 3 | 4 |
|---|---|---|---|
| Dispersion (%) | 97.5 | 76.1 | 94.3 |
| Indexed tan δ at 0° C. | 100 | 100 | 101 |
| Indexed tan δ at 30° C. | 100 | 100 | 100 |
| Indexed tan δ at 60° C. | 100 | 100 | 101 |
| Indexed M300 | 100 | 100 | 96 |
| Indexed EB | 100 | 94 | 98 |
| Indexed TB | 100 | 91 | 93 |

As can be seen from a review of the data appearing in Table 3, the use of the liquid pre-blend of starch and oil resulted in increased dispersion as compared to the use of 5 phr of starch without the pre-blend. Moreover, the use of the pre-blend provides comparable hysteretic and tensile properties to those of the control composition (Example 2) which lacks any starch in that each of the properties differ by less than 10%. As well, the decrease in certain properties (i.e., EB, TB) that was exhibited by the addition of 5 phr of starch without the pre-blend (Example 3) as compared to control Example 2 was at least somewhat ameliorated by the use of the liquid pre-blend of starch and oil in Example 4.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A starch-filled rubber composition having dispersed filler comprising:
   a. at least one elastomer;
   b. starch in an amount of about 1 to about 15 phr;
   c. at least one oil which is a liquid at 25° C.;
   d. at least one filler comprising carbon black, silica, or a combination thereof,
   wherein (c) is present in an amount of about 40 to about 95% by weight of the total amount of (b) and (c), and the starch-filled rubber composition has a filler dispersion of at least 90%.

2. The rubber composition according to claim 1, wherein (c) comprises at least one of: a plant oil, a petroleum oil, a mineral oil.

3. The rubber composition according to claim 2, wherein (c) is present in an amount of about 1 to about 20 phr.

4. The rubber composition according to claim 1, wherein (b) has an average particle size of about 5 to about 100 microns.

5. The rubber composition according to claim 1, wherein (b) comprises at least one of: potato starch, corn starch, maize starch, rice starch, wheat starch, tapioca starch, sorghum starch, banana starch, palm starch, or cassava starch.

6. The rubber composition according to claim 1, wherein the amount of (c) is about 40 to about 60% by weight of the total amount of (b) and (c).

7. The rubber composition according to claim 1, wherein the amount of (b) is about 5 to about 60% by weight of the total amount of (b) and (c).

8. A process for preparing a starch-filled rubber composition according to claim 1, the process comprising:
   i. providing a liquid pre-blend of the (b) and (c), and
   ii. mixing the liquid pre-blend with at least one elastomer and at least one filler to form a starch-filled rubber composition.

9. The process of claim 8, wherein (b) is present in an amount of about 3 to about 15 phr.

10. The process of claim 8, wherein (i) comprises heating to at least 70° C. and mixing.

11. The process of claim 8, wherein the liquid pre-blend is prepared in a first vessel and (ii) is conducted in a second vessel.

12. The process of claim 8, wherein a single vessel is utilized for both (i) and (ii).

13. The process of claim 8, wherein (ii) further comprises mixing a cure package.

14. A starch-filled rubber composition produced by mixing ingredients comprising:
   a. at least one elastomer in a total amount of 100 parts;
   b. starch in an amount of 1 to 15 phr;
   c. at least one oil which is a liquid at 25° C. in an amount of 1 to 20 phr;
   d. at least one filler comprising carbon black, silica, or a combination thereof;
   wherein (b) and (c) are prepared in a liquid pre-blend and the amount of oil in the liquid pre-blend is 40 to 95% by weight of the total amount of oil and starch.

15. The starch-filled rubber composition of claim 14, wherein (a) comprises a diene-based elastomer selected from the group consisting of styrene-butadiene rubber, polybutadiene, natural rubber, ethylene propylene diene monomer rubber, butyl rubber, neoprene, or polyisoprene, and combinations thereof.

16. The starch-filled rubber composition according to claim 14, wherein (c) comprises at least one of: a plant oil, a petroleum oil, a mineral oil.

17. The starch-filled rubber composition according to claim 14, wherein (b) has an average particle size of 5 to 100 microns.

18. The starch-filled rubber composition according to claim 14, wherein (b) comprises at least one of: potato starch, corn starch, maize starch, rice starch, wheat starch, tapioca starch, sorghum starch, banana starch, palm starch, or cassava starch.

19. The starch-filled rubber composition according to claim 18, wherein (b) is present in an amount of 3 to 15 phr.

20. The starch-filled rubber composition according to claim 14, further comprising a cure package including sulfur, at least one vulcanization accelerator, and at least one vulcanization activator.

21. The starch-filled rubber composition according to claim 1, wherein (d) consists of 5-100 phr of carbon black and 5-200 phr of silica.

22. The starch-filled rubber composition according to claim 1, wherein (d) consists of 5-25 phr of carbon black and 80-150 phr of silica.

23. The starch-filled rubber composition according to claim 1, wherein (d) comprises about 35 to about 100 phr of carbon black.

* * * * *